United States Patent [19]

Horton et al.

[11] Patent Number: 4,775,413
[45] Date of Patent: Oct. 4, 1988

[54] CONCENTRATION AND RECOVERY OF MINERAL VALUES FROM ORES

[75] Inventors: Robert L. Horton, South Russell, Ohio; George V. Lakey, Bartlesville, Okla.

[73] Assignee: Phillips Petroleum Company, Bartlesville, Okla.

[21] Appl. No.: 483,319

[22] Filed: Apr. 8, 1983

[51] Int. Cl.$^4$ .......................... C22B 60/02; C22B 3/00
[52] U.S. Cl. ...................................... 75/84.1 R; 75/2; 75/101 R
[58] Field of Search ................. 75/84.1 R, 101 R, 1 R, 75/2; 423/8, 9, 10, 20

[56] References Cited

U.S. PATENT DOCUMENTS

| | | | |
|---|---|---|---|
| 2,227,833 | 1/1941 | Hixson et al. | 423/8 |
| 2,690,376 | 9/1954 | Hoffman | 423/8 |
| 2,953,432 | 9/1960 | Hart et al. | 423/8 |
| 2,973,864 | 3/1961 | McGarry | 75/1 R |
| 3,409,415 | 11/1968 | Moore et al. | 423/9 |
| 3,812,232 | 5/1974 | Bauer et al. | 423/10 |
| 3,835,213 | 9/1974 | Ritcey et al. | 423/9 |
| 4,381,287 | 4/1983 | MacDonald et al. | 423/9 |

OTHER PUBLICATIONS

Mortimer, *Chemistry: A Conceptual Approach*, Reinhold Chemistry Textbook (1967), pp. 214–215.

Hackh's Chemical Dictionary, 4th edition, McGraw Hill, N.Y. (1969), pp. 523, 666, 697.
*Merck Index*, 10th ed., Merck & Co. Inc., Rathway, N.J., (1983), p. 749, No. 5061, "isoproyl ether".

Primary Examiner—John F. Terapane
Assistant Examiner—Eric Jorgensen
Attorney, Agent, or Firm—Paul S. Chirgott

[57] ABSTRACT

An ore containing an increased percentage of mineral values, particularly uranium values, is separated from an ore containing a lower percentage of such mineral values by contacting the ore containing the lower percentage of mineral values with a polar solvent, particularly water, and a nonpolar solvent, such as an isoparaffin mixture, and separating a polar solvent phase containing a portion of the contacted ore from a nonpolar solvent containing another portion of the contacted ore. The ore may be a total ore containing both coarse and fines or a fines fraction which has been separated from a total ore as by wet classification. Where a total ore is treated in accordance with the present invention, in one embodiment of the invention, a coarse ore fraction can be separated from the total ore either during the contacting step or the separating step. A method of recovering mineral values from a ground ore is disclosed, which includes recovering such mineral values from an ore fraction which has been enriched in such mineral values as set forth above.

22 Claims, 2 Drawing Sheets

CONCENTRATION AND RECOVERY OF MINERAL VALUES FROM ORES

BACKGROUND OF THE INVENTION

The present invention relates to the concentration of mineral values in mineral-containing ores. In a more specific aspect, the present invention relates to the concentration of uranium values in uranium-containing ores. In another aspect, the present invention relates to the concentration of mineral values in ores and the recovery of such mineral values from the ores.

Numerous minerals are present in subsurface earth formations in very small quantities which make their recovery extremely difficult. However, in most instances, these minerals are also extremely valuable, thereby justifying efforts to recover the same. An example of one such mineral is uranium. However, numerous other valuable minerals, such as copper, nickel, molybdenum, rhenium, silver, selenium, vanadium, thorium, gold, rare earth metals, etc., are also present in small quantities in subsurface formations, alone and quite often associated with uranium. Consequently, the recovery of such minerals is fraught with essentially the same problems as the recovery of uranium and, in general, the same techniques for recovering uranium can also be utilized to recover such other mineral values, whether associated with uranium or occurring alone. Therefore, a discussion of the recovery of uranium will be appropriate for all such minerals.

Uranium occurs in a wide variety of subterranean strata, such as granites and granitic deposits, pegmatites and pegmatite dikes and veins, and sedimentary strata, such as sandstones, unconsolidated sands, limestones, etc. However, very few subterranean deposits have a high concentration of uranium. For example, most uranium-containing deposits contain from about 0.01 to 1 weight percent uranium, expressed as $U_3O_8$ as is conventional practice in the art. Few ores contain more than about 1 percent uranium and deposits containing below about 0.1 percent uranium are considered so poor as to be currently uneconomical to recover unless other mineral values, such as vanadium, gold and the like, can be simultaneously recovered.

The concentration of an ore by physical methods offers several advantages, including decreased weight of material to be handled and the ability to process ores containing low concentrations of mineral values. Physical concentration methods include grinding and sizing, gravity, magnetic, electrostatic and flotation separations and various sorting techniques. However, few ores are amenable to any of these processes. Uranium concentration to any useful extent can rarely be achieved without excess losses to tailings. Most successful installations are based upon grinding and sizing in which the ground ore is separated into a coarse and a fines fraction, with the uranium more concentrated in the fines fraction. Another often used technique for concentrating uranium is roasting of the ore usually in the presence of a combustion-supporting gas, such as air or oxygen. Such roasting concentrates the uranium in the resultant ash.

The most widely used technique for the extraction of uranium values from ores is by the utilization of aqueous leaching solutions. There are two common leaching techniques for recovering uranium values, which depend primarily upon the accessibility and size of the subterranean deposit. To the extent that the deposit containing the uranium is accessible by conventional mining means and is of sufficient size to economically justify conventional mining, the ore is mined, ground to increase the contact area between the uranium values in the ore and the leach solution, usually less than about 14 mesh but in some cases, such as limestones, to nominally less than 325 mesh, and contacted with an aqueous leach solution for a time sufficient to obtain maximum extraction of the uranium values. On the other hand, where the uranium-containing deposit is inaccessible or is too small to justify conventional mining, the aqueous leach solution is injected into the subsurface formation through at least one injection well penetrating the deposit, maintained in contact with the uranium-containing deposit for a time sufficient to extract the uranium values and the leach solution containing the uranium, usually referred to as a "pregnant" solution, is produced through at least one production well penetrating the deposit. The present invention is directed to the roasting and/or leaching of ores.

The most common aqueous leach solutions are either aqueous acidic solutions, such as sulfuric acid solutions, or aqueous alkaline solutions, such as sodium carbonate and/or bicarbonate.

Aqueous acidic solutions are normally quite effective in the extraction of uranium values. However, aqueous acidic solutions generally cannot be utilized to extract uranium values from ore or in situ from deposits containing high concentrations of acid-consuming gangue, such as limestone. Aqueous alkaline leach solutions are applicable to all types of uranium-containing materials and are less expensive than acids.

The uranium values are conventionally recovered from acidic leach solutions by techniques well known in the mining art, such as direct precipitation, selective ion exchange, liquid extraction, etc. Similarly, pregnant alkaline leach solutions may be treated to recover the uranium values by contact with ion exchange resins, precipitation, as by adding sodium hydroxide to increase the pH of the solution to about 12, etc.

As described to this point, the extraction of uranium values is dependent to some extent upon the relative costs of acidic leach solutions versus alkaline leach solutions. However, this is an oversimplification, to the extent that only uranium in its hexavalent state can be extracted in either acidic or alkaline leach solutions. While some uranium in its hexavalent state is present in ores and subterranean deposits, the vast majority of the uranium is present in its valence states lower than the hexavalent state. For example, uranium minerals are generally present in the form of uraninite, a natural oxide of uranium in a variety of forms such as $UO_2$, $UO_3$, $UO \cdot U_2O_3$ and mixed $U_3O_8$ ($UO_2 \cdot 2UO_3$), the most prevalent variety of which is pitchblende containing about 55 to 75 percent of uranium as $UO_2$ and up to about 30 percent uranium as $UO_3$. Other forms in which uranium minerals are found include coffinite, carnotite, a hydrated vanadate of uranium and potassium having the formula $K_2(UO_2)_2(VO_4)_2 \cdot 3H_2O$, and uranites which are mineral phosphates of uranium with copper or calcium, for example, uranite lime having the general formula $CaO \cdot 2UO_3 \cdot P_2O_5 \cdot 8H_2O$. Consequently, in order to extract uranium values from ores with aqueous acidic or aqueous alkaline leach solutions, it is necessary to oxidize the lower valence states of uranium to the soluble, hexavalent state.

Combinations of acids and oxidants which have been suggested by the prior art include nitric acid, hydrochloric acid or sulfuric acid, particularly sulfuric acid, in combination with air, oxygen, sodium chlorate, potassium permanganate, hydrogen peroxide and magnesium dioxide, as oxidants. Alkaline leachants and oxidants heretofore suggested include carbonates and/or bicarbonates of ammonium, sodium or potassium in combination with air, oxygen or hydrogen peroxide, as oxidants. However, sodium bicarbonate and/or carbonate have been used almost exclusively in actual practice.

Numerous problems obviously arise in the leaching of uranium values from uranium-containing ores. One of the most obvious is, of course, the large quantities of ores being handled and treated compared with the amount of uranium recovered. Such large quantities of ores make it costly to crush and grind the same to a size which can be effectively leached in a relatively short period of time. For example, as previously pointed out, leached ore should be reduced in size to less than about 14 mesh, but an even smaller size, in the neighborhood of 100 to 400 mesh, or smaller, would be ideal. The cost of the latter, however, becomes prohibitive. It is therefore, desirable to reduce the degree of grinding necessary. In addition, it would be highly desirable to reduce the quantities of ores handled in any given step of the process or to be able to process ores having low concentrations of uranium.

The large quantities of ores being treated also increase the amounts of leachant or lixivants and oxidants required in order to recover a given amount of uranium and/or attain such recovery in a reasonable time. Thus, it is also highly desirable to reduce the amounts of leachant or lixivant and oxidant to a minimum for effective results.

While the leaching operation can be carried out at temperatures from atmospheric temperature up to about the boiling point of water, it is known that the higher the temperature, the more effective and more rapid the leaching. Consequently, the usual range of temperatures is between about 80 and about 100° C. While this temperature range appears modest for most chemical operations, in the leaching of uranium-containing ore, the temperature becomes a very significant problem. This is true since, at the high temperatures employed, the cost of materials of construction of the leaching tanks is a major factor. For example, it is necessary to use rubber lined stainless steel tanks and the manufacturers of such tanks will not assure reasonable lifetimes for the linings. Consequently, the utilization of less expensive equipment is desirable and even a small reduction in the temperature of the leaching operation can substantially reduce equipment costs and lengthen equipment life.

While it is relatively easy to recover 50% to 60% of the uranium content of an ore, at relatively low temperatures, with relatively low concentrations of leach solution and in relatively short periods of time, such recoveries are not acceptable in industrial operations. For an economic operation, recoveries in excess of about 85% of the original uranium are required and usually above 90%. This, again, contributes substantially to the cost of leach solutions. Also, as in any other operation of this type, it is relatively easy to approach the desired and economic recoveries, but it is most difficult to attain recovery of those last small increments which are necessary or desirable for an effective and economic operation.

As in any industrial operation, the time required or rate is a significant economic factor. Consequently, it would also be highly desirable to be able to increase the rate of recovery, even though no greater recovery is obtained. Here again, even a very small increase in rate makes a substantial difference in the overall operation.

Thus, it is obvious from the above that preliminary concentration of uranium in ores will also overcome or greatly reduce the previously mentioned disadvantages connected with the extraction of uranium from the ore.

SUMMARY OF THE INVENTION

It is therefore an object of the present invention to provide an improved process which overcomes the above problems and disadvantages of the prior art. Yet another object of the present invention is to provide an improved method of concentrating mineral values in mineral-containing ores. Another and further object of the present invention is to provide an improved method for concentrating uranium values in uranium-containing ores. Yet another object of the present invention is to provide an improved method of concentrating mineral values in ores which permits the processing of low grade ores. A further object of the present invention is to provide an improved method of concentrating mineral values in ores which is relatively simple and inexpensive. Still another object of the invention to provide a method of recovering mineral values from mineral-containing ores, which overcome the above problems and disadvantages of the prior art. Another object of the present invention is to provide a method for recovering mineral values from mineral-containing ores which reduces the degree of comminution of the ore necessary and/or the cost of such comminution. Another and further object of the present invention is to provide an improved method for recovering mineral values from mineral-containing ores which reduces the volume of ores handled in at least one stage of the method. A further object of the present invention is to provide an improved method for recovering mineral values from mineral-containing ores which reduces the amount and/or cost of treating materials necessary. A still further object of the present invention is to provide a method for recovering mineral values from mineral-containing ores, which reduces the severity of the conditions of operation necessary. Yet another object of the present invention is to provide an improved leaching method for recovering mineral values from mineral-containing ores which reduces the temperature of treatment and/or the concentration of active ingredients in the leach solution. Another and further object of the present invention is to provide a method for recovering mineral values from mineral-containing ores which reduces the cost and/or extends the life of the treating equipment employed. Another and further object of the present invention is to provide an improved method for recovering mineral values from mineral-containing ores including concentration of the mineral values in the ore, followed by recovery of the mineral values from the ore in accordance with any or all of the above objectives. A further object of the present invention is to provide an improved method of concentrating mineral values in ores and leaching and roasting selected portions of the ore. These and other objects and advantages of the present invention will be apparent from the following description.

In accordance with the present invention, mineral values are recovered from a total ground ore or a fines fraction separated from a ground ore, particularly uranium values from uranium-containing ores, by contacting the ore with a solvent mixture of a polar solvent, particularly water, and a nonpolar solvent, separating the polar and the nonpolar solvent to produce a polar solvent fraction containing a portion of the ore and having a lesser amount of the mineral values and a nonpolar solvent fraction containing a portion of the ore and having a substantially increased amount of the mineral values. The polar solvent containing ore and the nonpolar solvent containing ore may thereafter be filtered to remove the ore from the solvents, the solvents may be recycled for reuse and the ores thereafter separately treated to recover mineral values therefrom or the fraction of the ore of reduced mineral content disposed of as tailings and the fraction of increased mineral content treated to recover mineral values therefrom. In accordance with another aspect of the present invention, a total ore is simultaneously separated into a coarse fraction and a fines fraction by contacting the ore with the previously mentioned mixture of polar and nonpolar solvents, separating a coarse fraction from the mixture, separating the polar solvent containing a portion of the fines fraction from the nonpolar solvent containing the remainder of the fines fraction and thereafter separately treating the three fractions for the recovery of the mineral values therefrom or disposing of the coarse fraction and/or the polar solvent-wet fraction and treating the nonpolar solvent-wet fraction to recover the mineral values.

DESCRIPTION OF THE PREFERRED EMBODIMENTS

Figure 1:
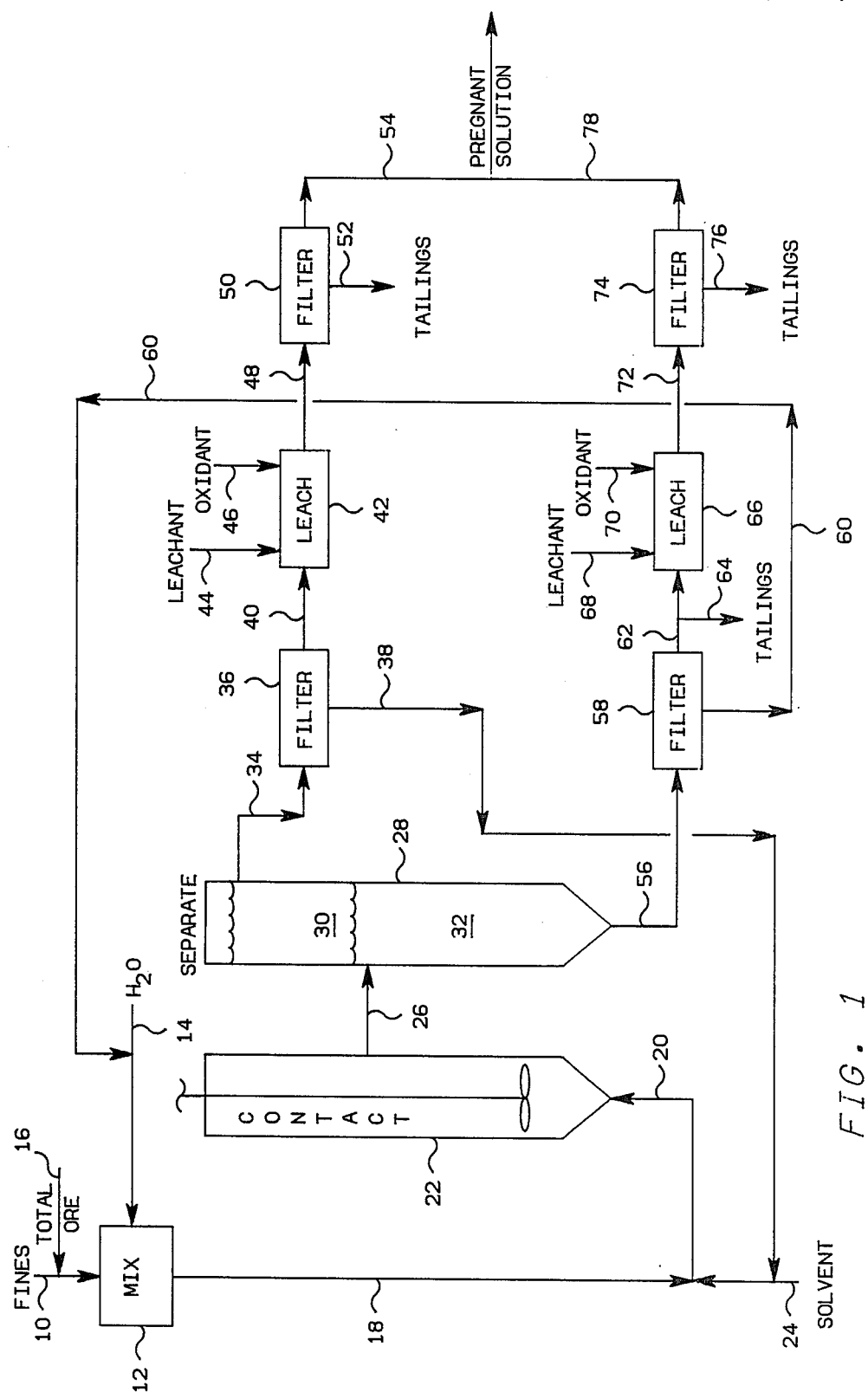
FIG. 1 of the drawings is a simplified flow diagram illustrating one embodiment of the present invention.

As previously indicated, either a total ground ore containing coarse and fine ore may be treated in accordance with the present invention or the ore may be classified into a coarse fraction and a fines fraction and the fines fraction treated in accordance with the present invention.

When an ore is ground and separated into a coarse fraction and a fines fraction, the latter often being referred to as "slime", the fines fraction will normally contain a substantially larger quantity of mineral values, particularly uranium, as compared with the coarse fraction. In addition, it has been found that it is easier to leach uranium from the coarse fraction than from the fines fraction. Specifically, a greater percentage of the uranium can be leached from the coarse fraction with leach solutions of essentially the same concentration, essentially the same percentage of uranium can be extracted from the coarse fraction with lower concentrations of leach solutions, the temperature of the leaching step can be lower in the leaching of the coarse fraction and/or essentially the same percentage of uranium can be leached from the coarse fraction, as compared with the fines fraction, in a shorter period of time. Consequently, substantial benefits can be attained by separately leaching the coarse and fine fractions. For example, by leaching the coarse fraction separately, the quantities of acid or alkali and oxidant can be reduced to some extent, thus reducing the cost of chemicals, a lower temperature can be used, the cost of equipment can be reduced and/or its life extended, the overall recovery of uranium can be increased and the time necessary in which a given amount of uranium can be recovered is reduced. Similarly, where roasting is utilized as a means for concentrating uranium values, it is advantageous to separate the ground ore into a coarse fraction and a fines fraction and roast only the coarse fraction, depending upon the uranium content of the coarse fraction, it is also possible to simply discard, as tailings, a coarse fraction containing insignificant amounts of uranium. Accordingly, in accordance with one embodiment of the present invention, it is preferred that the ground ore be preliminarily separated into a coarse fraction and a fines fraction.

A mined ore is generally crushed and then ground, for example by the use of ball mills or rod mills. Conventionally, the ore is ground to a particle size less than about 100 mesh and in some cases, less than about 325 mesh, depending upon the nature of the ore. However, in accordance with the present invention, it is not necessary to grind the ore to this degree of fineness, but instead, the ore can be ground so that a majority passes a 30-mesh screen and preferably so that the majority passes a 14-mesh screen. Again, the size will vary according to the nature of the ore but overall will be substantially larger than conventional practice in the art. Separation of the ore into a coarse fraction and a fines fraction may be done by screening, for example, to produce a fines fraction, of which a majority will pass through a 200-mesh screen or smaller. For example, one type of uranium-containing ore can be screened so that a majority passes a screen in the neighborhood of 400-mesh, while another specific uranium-containing ore would be screened so that the majority passes a screen in the neighborhood of about 300-mesh. However, it is preferred that the separation be carried out by wet classification, which is known to those skilled in the art of minerals recovery. In the present case, where wet classification is utilized, the solids which float in the solution are separated and are referred to herein as the fines fraction, whereas the solids which settle out are referred to herein as the coarse fraction. Applying wet classification to the two specific uranium-containing ores referred to above, wet classification resulted in a fines fraction, of which about 91% passed a 400-mesh screen in the first case and of which about 87% percent passed a 325-mesh screen in the second case.

In accordance with one embodiment of the present invention, the thus separated fines fraction is contacted with a nonpolar solvent and a polar solvent. Since water is one of the most effective polar solvents and, of course, is the most economical, all reference hereinafter will be to water as the polar solvent. However, it is to be recognized that other polar solvents could be utilized, provided however, that they are immiscible with the nonpolar solvent to thereby permit the hereinafter mentioned phase separation.

To the extent that the fines fraction has been separated from the total ore by means of wet classification, a mixture of water and fines fraction will exist. Appropriate amounts of water may be added or removed so that a proper solids content can be provided, for example, between about 50% to 70% by weight of solids.

While the nonpolar solvent may be added to the ore with the water, it is more convenient to separately add the nonpolar solvent.

The ratio of nonpolar solvent to water will depend upon the nature of the ore being treated, the amount of uranium in the ore and the nature of the nonpolar solvent. This ratio may range anywhere from 0.1 to 10. In any event, one skilled in the art can readily determine the optimum solvent/water ratio by simple experimentation. The solids content of the mixture of solids, nonpolar solvent and water will also depend upon the type of ore, the uranium content of the ore, the nature of the nonpolar solvent and the type of contacting and contacting equipment which is utilized. By way of example only, the solids content, based upon the total weight of the solvent-water mixture, may range anywhere from about 5% to 50% by weight.

Nonpolar solvents are well known to those skilled in the art and include paraffinic hydrocarbons, isoparaffinic hydrocarbons, benzene, carbon disulfide, carbon tetrachloride, other halide-substituted hydrocarbons and the like.

Contacting of the ore with the nonpolar solvent and water can be carried out in any known fashion, such as batch, continuous, semicontinuous, continuous concurrent and continuous countercurrent, the only requirement being that the residence time or contact time be sufficient to cause a separation of the ore into a solvent-wet fraction and a water-wet fraction.

Following contact of the ore with the solvent and water, the solvent and water are allowed to separate into two phases, including a mixture of solvent and a solvent-wet ore fraction and a mixture of water and a water-wet ore fraction. It has been found, in accordance with the present invention, that the solvent-wet ore fraction is substantially enriched in uranium when compared with the water-wet ore fraction.

The water may be removed from the water-wet ore fraction by any convenient means, as by filtering or decanting and can thereafter be recycled or reused. Similarly, the solvent may be removed from the solvent-wet ore fraction by well-known means such as decanting or filtering and is recovered for recycle or reuse. The solvent-wet ore fraction can be further treated by known techniques, such as water washing, steam distillation, or distillation to recover the majority of the solvent from the ore, since the solvent is obviously the more expensive material involved.

The thus separated water-wet ore fraction and solvent-wet ore fraction may be separately treated by any known method for recovering the uranium from the fractions separately. This procedure has the advantage that the water-wet ore fraction can be more readily extracted as by leaching under significantly milder conditions of time, temperature, leachant and oxidant. However in the preferred procedure, the water-wet ore fraction is simply discarded as tailings, particularly where the original ore was low in uranium values, and only the solvent-wet ore fraction is then treated by conventional means to recover the uranium therefrom. While any known means of recovering uranium from an ore may be utilized, a preferred technique in accordance with the present invention is to leach the ore with an acid or an alkaline leach material.

The amount of acid or alkaline material utilized conventionally is between about 180 and about 400 pounds per ton or ore. The amount of oxidant is generally between about the stoichiometric amount necessary for conversion of all of the uranium to a hexavalent state, up to as high as two times the stoichiometric amount. This will generally result in an oxidant concentration from about 10 to about 80 pounds per ton of ore. As previously indicated, the leach temperature can be from atmospheric to about the boiling point of water and for best results, the temperature is usually between about 80° C. and about 100° C. The leaching operations, as such, may be carried out in a variety of known ways. For example, where a slurry of ore is preliminarily formed, the leaching step will ordinarily be a batch-type operation. On the other hand, it is possible to carry out the leaching in a continuous manner by introducing partially slurried ore, or dry ore, and a solution of the leachant and oxidant. Such a continuous operation may be carried out either by concurrently flowing the two materials or countercurrently flowing the same. Contacting times in the leaching step will also vary in accordance with the particle size of the ore, the concentration of leachant and oxidant and the temperature. Generally, contact times between about 24 and about 48 hours or more, are necessary. Pregnant leach solution is then separated from the ore, the ore is washed with water to recover residual leach solution, usually in a countercurrent fashion, and all or part of the wash solution may be added to the leach solution. The pregnant leach solution is generally filtered to remove residual solids. The pregnant leach solution is then treated to recover uranium values in accordance with known procedures which have been heretofore mentioned in the introductory portion hereof.

Where a total ore including both coarse and fines is to be treated in accordance with the previously described procedure, the coarse ore may be removed with the water-wet ore fraction following the previously described phase separation. In this case it is obviously best to select a nonpolar solvent having a specific gravity less than that of water so that the water-wet phase, including the water-wet ore fraction and the coarse fraction may be conveniently separated. Again, the two phases, including solvent and the solvent-wet ore fraction and water, the water-wet ore fraction and the coarse fraction would be recovered from the solvent and water respectively by decanting or filtering. Thereafter, the solvent-wet ore fraction and the water-wet ore fraction, together with the coarse fraction, can be separately treated to recover uranium therefrom. Alternatively, the water-wet ore fraction and coarse fraction may be discarded as tailings and only the solvent-wet ore fraction treated to recover uranium.

In another embodiment of the present invention, a total ore may be treated to simultaneously concentrate uranium and size-classify the ore. Specifically, the total ore would be contacted with the nonpolar solvent and water in the contacting step, in the same manner previously described, and the resultant mixture separated into a coarse ore fraction, a water-wet fine ore fraction and a solvent-wet fine ore fraction enriched in uranium. While this separation can be carried out irrespective of whether the nonpolar solvent has a specific gravity higher or lower than water, it would be most convenient to carry out the separation if the nonpolar solvent has a specific gravity lower than water. The coarse ore fraction may be appropriately separated from the remaining mixture by screening or other means within the contacting step or the separation step. Where a batch or continuous type operation is carried out, separation of the coarse ore fraction, as well as phase separation of the solvent-wet ore mixture and the water-wet ore mixture can be carried out in the contacting unit. The thus separated coarse fraction, water-wet fines fraction, after separating from water, and solvent-wet fines fraction, after separation from solvent, may then be treated in any conventional manner for the recovery of uranium values therefrom. For example, the coarse ore fraction may be roasted to produce an ash of increased uranium content and the ash thereafter conventionally leached to recover the uranium therefrom and the water-wet fines fraction and the solvent-wet fines fraction may be separately leached by conventional means. Alternatively, the coarse ore fraction and/or the water-wet fines fraction may be discarded as tailings and only the solvent-wet fines fraction treated to recover uranium values.

Specific embodiments of the present invention, as well as additional details, not previously mentioned, will be apparent from the following description when read in conjunction with the drawings.

FIG. 1 of the drawings illustrates one embodiment of the present invention. In accordance with FIG. 1 an ore fines fraction previously separated from a total ore is introduced through line 10 to an appropriate mixer 12 where it is formed into a slurry with water introduced through line 14. In the event that the fines have been separated from the total ore by wet classification, the fines will generally be in the form of a slurry with water. Additional water may be added through line 14 where necessary. If, on the other hand, too much water is present in the fines fraction, it may be removed by a step not shown to attain the appropriate solids concentration of the slurry. Alternatively, a total ore, including both coarse and fines may be introduced through line 16 and mixed with water through line 14 to produce an appropriate slurry. The slurry from mixing zone 12 passes through line 18 and thence through line 20 to contactor 22. The nonpolar solvent is introduced to the system through line 24 and thence through line 20 to contactor 22. In contactor 22, the ore, water and solvent are intimately mixed, preferably with stirring and a portion of the ore will become associated with the water, while a second portion will become associated with the solvent. Preferably a mixing means or stirrer is provided in contactor 22. The composite mixture is then discharged from contactor 22 through line 26 and passed to separator 28. In separator 28 the composite mixture is maintained for a period of time sufficient to separate the material into two phases. Where the solvent has a specific gravity greater than water, the lower phase will comprise solvent and solvent-wet ore whereas the upper phase will comprise water and water-wet ore. On the other hand where the specific gravity of the solvent is less than 1, as shown in the figure, the upper phase 30 will comprise the solvent and solvent-wet ore, whereas the lower phase 32 will comprise the water and water-wet ore. The solvent and solvent-wet ore will be withdrawn through line 34. The solvent-wet ore will be separated from solvent by decantation or filtering as illustrated by filter 36 and the solvent will be recycled for reuse through line 38. The filtered, and preferably dried, solvent-wet ore fraction will be passed through line 40 to leach step 42. In leach step 42 it is contacted with an acidic or alkaline leachant introduced through line 44 and an oxidant introduced through line 46. The leachant and barren ore are passed through line 48 to a separating step such as a decanting step or a filtering step, as illustrated by filter 50. In filter 50 the barren ore will be separated and discharged through line 52 and the pregnant leach solution will be discharged through line 54. The pregnant leach solution would then be conventionally treated as by precipitation, ion exchange, etc. to remove the dissolved uranium from the leach solution. The leach solution can then, of course, be recycled for reuse. Water and water-wet ore is withdrawn from separator 28 through line 56 and passed to filter 58. In filter 58, the water-wet ore is separated from the water and the water is recycled for reuse through line 60. Since the water-wet ore fraction contains a substantially reduced amount of uranium, particularly where the original ore was a low grade ore, the water-wet ore fraction discharged through line 62 may be disposed of as tailings through line 64. Alternatively, where the water-wet ore fraction discharged through line 62 contains significant amounts of uranium which can be efficiently and economically recovered, the water-wet ore is passed to leaching step 66 where it is contacted with a leachant introduced through line 68 and an oxidant introduced through line 70. The leach solution and barren ore from leaching step 62 is then passed through line 72 to an appropriate filter means 74. In filter means 74 the barren ore is separated and discharged as tailings through line 76 and the pregnant leach solution is withdrawn and passed through line 78. As previously indicated, the leaching of the water-wet ore fraction may be carried out under less severe conditions than the leaching of the solvent-wet ore fraction. As will be hereinafter pointed out in connection with the example, it is preferred that the phase separation step be carried out as a series of sequential separation steps, since it has been found, in accordance with the present invention, that solvent-wet ore containing larger amounts of uranium can be produced in this fashion.

Figure 2:
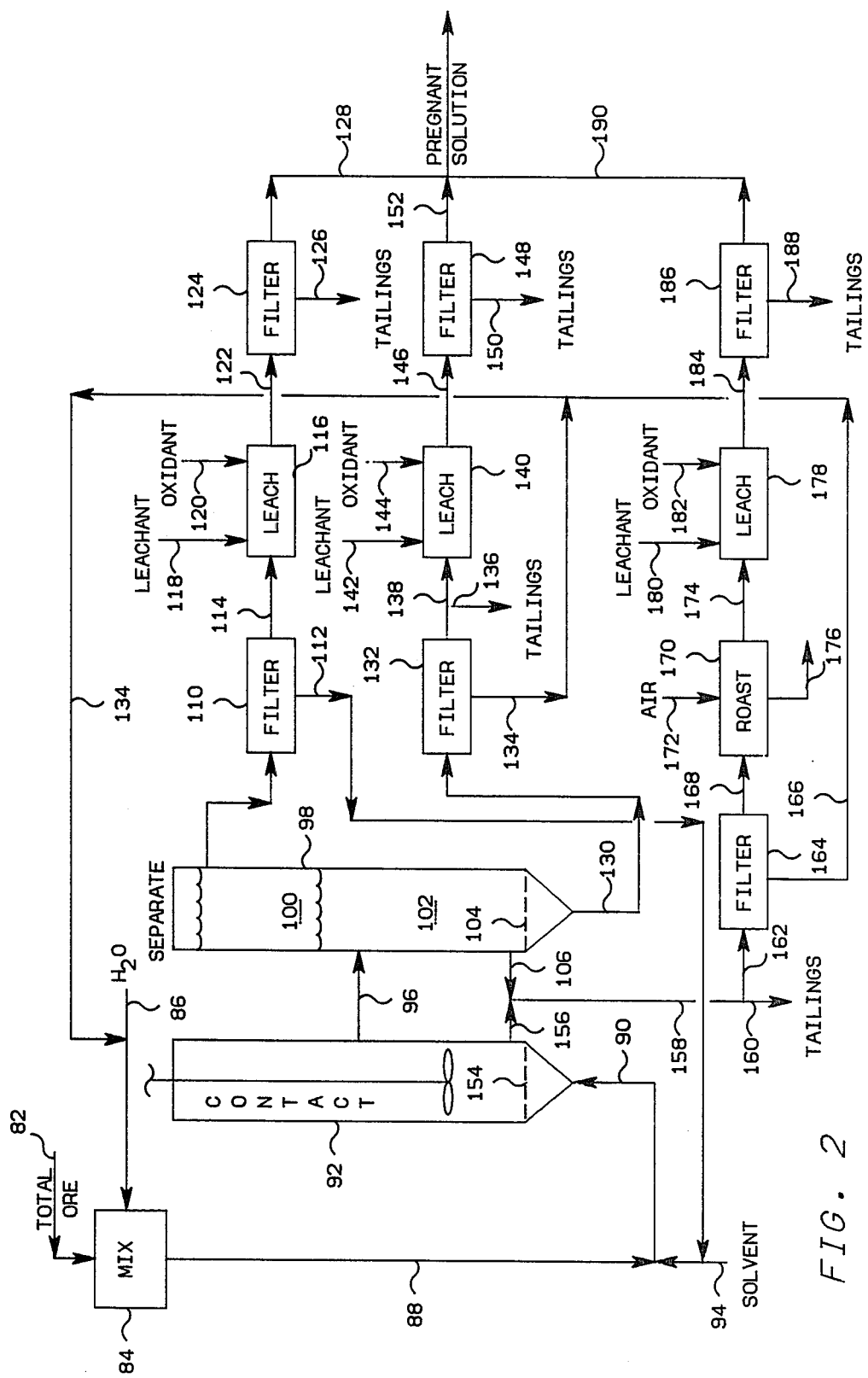
FIG. 2 is a simplified flow diagram illustrating another embodiment of the present invention.

FIG. 2 of the drawings illustrates another embodiment of the present invention in which a total ore, including both coarse and fines, can be treated in accordance with the present invention to simultaneously classify the ore into a coarse and a fines fraction and produce a uranium rich solvent-wet fines fraction. In accordance with FIG. 2 the total ore, including coarse and fines, is introduced to the system through line 82 to mixer 84 where it is mixed with water introduced through line 86 to form a water-ore slurry. The water-ore slurry is passed through line 88 and thence through line 90 to contactor 92. Solvent is introduced to the system through line 94. In contactor 92 the mixture of water, ore and nonpolar solvent are intimately contacted to transfer a part of the ore to the solvent and a part to the water, thereby forming a solvent-wet fraction of the ore and a water-wet fraction of the ore. The composite ore is passed through line 96 to separator 98. In separator 98 the composite mixture is separated into an upper phase 100 comprising solvent and solvent-wet ore and a lower water phase 102 containing a water-wet ore fraction. In separator 98 the coarse ore fraction will also settle to the bottom of the separator due to its greater density and/or particle size and, thus, simultaneously effect separation of the two phases previously mentioned, as well as a coarse ore fraction. In order to prevent the coarse ore fraction from passing out of separator 98 through the bottom line with the water and water-wet ore fraction, a screen 104 or other appropriate means is provided in separator 98. The coarse fraction can therefore be withdrawn through line 106 while the water and water-wet fines fraction will pass through screen 104 and be discharged through the bottom of contactor 98. Solvent and solvent-wet fines discharged through line 108 is passed through filter 110 where the solvent-wet ore fraction is separated from the solvent and the solvent is recycled through line 112 for reuse.

The filtered solvent-wet ore which has been substantially increased in uranium content passes through line 114 to leach step 116. In leach step 116, the solvent-wet fines fraction is contacted with a leachant introduced through line 118 and an oxidant introduced through line 120. The mixture of pregnant leach solution and barren ore is passed through line 122 to filter 124 where the barren ore is filtered off and discharged through line 126 as tailings. The pregnant leach solution containing the extracted uranium is discharged through line 128. Water and a water-wet fines fraction is discharged from separator 98 through line 130 to filter 132. In filter 132, water is filtered off and discharged through line 134 where it is recycled for reuse. The water-wet fines fraction which has a substantially reduced uranium content may be discharged as tailings through line 136. Alternatively, the water-wet fines fraction may be passed through line 138 to leach step 140. In leach step 140, the water-wet fines fraction is contacted with a leachant introduced through line 142 and an oxidant introduced through line 144. The mixture of leach solution and barren ore is passed through line 146 to filter 148 where the barren ore is separated and discharged as tailings through line 150. The pregnant leach solution containing the extracted uranium is discharged through line 152 for further processing to recover the uranium. As previously indicated, the coarse ore fraction of the total ore is separated by settling in separator 98 and removed through line 106. However, it is also possible to provide a screen means 154 in contactor 92 and withdraw a coarse fraction through line 156. However in some cases, the latter procedure would not be efficient if, for example, a certain amount of solvent may be withdrawn with the coarse fraction. However, this point of removal of the coarse fraction can be best carried out in a contacting step in which ore is introduced at the top of the contacting unit and water and/or solvent is introduced to the bottom of the column to flow countercurrently to the downwardly moving ore. This has the obvious advantage that the fines are more readily washed from the coarse ore. Irrespective of where the coarse fraction is separated, such coarse fraction is discharged through line 158 and may be discarded through line 160 as tailings. Alternatively, the coarse fraction may be passed through line 162 to a filter 164 where any water or other fluids are separated and discharged through line 166 for recycle and reuse. The filtered coarse ore fraction can then be leached in a conventional manner or, as shown in the drawing, it may be passed to a roasting unit 170 where it is roasted in the presence of air introduced through line 172. The resultant ash which is enriched in uranium is withdrawn through line 174 and a gange or waste portion is disposed of through line 176. The ash fraction can then be leached in leaching step 178. In leaching step 178, the ash fraction is contacted with a leachant introduced through line 180 and an oxidant introduced through line 182. Leach solution containing the barren ash is withdrawn through line 184 and passed to filter 186. In filter 186 the denuded ash is separated and discharged as tailings through line 188 while the pregnant leach solution is discharged through line 190.

The following example illustrates certain of the advantages of the method of the present application.

In the series of tests set forth in the Table below, a fines fraction separated from a total ore by wet classification was placed in a separatory funnel with a given amount of water and a given amount of Soltrol ® (a product of Phillips Petroleum Company).

This solvent is a nonpolar organic solvent immiscible with water and comprises an isoparaffinic hydrocarbon mixture having a specific gravity of 0.879. For comparative purposes, Run No. 1 was carried out utilizing water and trichloroethane having an average specific gravity of 1.46 and which is a polar solvent immiscible with water. The mixture of ore, water and solvent was then shaken until all ore was dispersed in the liquids. Thereafter, the mixture was let stand until a phase separation between the water and solvent became stable. The lower phase was then drawn off and both phases were filtered to recover the ore. Both the water-wet ore fraction and the solvent-wet ore fraction were then analyzed for uranium content. The results of a series of runs carried out in this manner are set forth in the table below.

TABLE

| Run # | Ore Type | Original Wt. % $U_3O_8$ in Ore | Type Solvent* | Wt. % Solids in Liquid Mix | Ratio Solvent/$H_2O$ | Wt. % $U_3O_8$ in Solvent-Wet Ore | Wt. % $U_3O_8$ in $H_2O$-Wet Ore | Ratio $U_3O_8$ in Solvent-Wet/$H_2O$-Wet |
|---|---|---|---|---|---|---|---|---|
| 1 | A-Fines | 0.372 | P  | 10 | 4.4  | 0.358  | 0.415  | 0.863 |
| 2 | A-Fines | 0.376 | NP | 20 | 1.17 | 0.408  | 0.296  | 1.378 |
| 3 | A-Fines | 0.395 | NP | 20 | 0.78 | 0.558  | 0.318  | 1.755 |
| 4 | B-Fines | 0.320 | NP | 20 | 1.17 | 0.3904 | 0.2490 | 1.568 |
| 5 | B-Fines | 0.405 | NP | 20 | 0.78 | 0.5630 | 0.3185 | 1.768** |

*P means polar; NP means nonpolar
**Two-stage separation

As shown by the above results, the separated solvent-wet ore fraction is substantially enriched in uranium when utilizing a nonpolar solvent, as compared with a separation of the same ore carried out utilizing a polar solvent. It is also apparent that improved results were obtained with a polar solvent utilizing two different types of ore. The data also indicate that the lower ratios of solvent to water are superior to higher ratios with the result that a solvent-to-water ratio of about 1.0 is preferable. Finally, as shown by Run No. 5 as compared with the other runs, a multi-stage separation is superior to a single stage separation of the water and solvent phases.

While specific materials, specific items of equipment and specific steps and conditions of operation have been set forth herein, it is to be understood that such specifics are by way of illustration and to set forth the best mode, in accordance with the present invention, and the invention is not to be limited by such recitals.

That which is claimed:

1. A method for upgrading a ground, raw ore containing mineral values, comprising:
   (a) contacting said raw ore with both a polar solvent and a nonpolar solvent, which solvents are immiscible with one another, to form a mixture of said raw ore, said polar solvent and said nonpolar solvent;

(b) said polar solvent and said nonpolar solvent being present in amounts sufficient to form two, immiscible, separable, liquid phases;

(c) settling the thus formed mixture for a time sufficient to effect separation of two immiscible liquid phases, including; a liquid, polar solvent phase, containing an ore fraction having a lower percentage of said mineral values than said raw ore, and a liquid, nonpolar solvent phase, containing an ore fraction having a higher percentage of said mineral values than said raw ore; and (d) separating said polar solvent phase from said nonpolar solvent phase.

2. A method in accordance with claim 1 wherein the raw ore is a total ground, raw ore containing both a coarse ore fraction and a fines ore fraction.

3. A method in accordance with claim 2 which additionally includes separating the coarse ore fraction during one of (1) the contacting step and (2) the separation of the polar solvent phase from the nonpolar solvent phase, and the ore fraction having a lower percentage of mineral values is a first portion of the fines ore fraction and the ore fraction having a higher percentage of mineral values is a second portion of said fines ore fraction.

4. A method in accordance with claim 3 wherein the coarse ore fraction is thus separated during the step of separating the polar solvent phase from the nonpolar solvent phase.

5. A method in accordance with claim 1 wherein the raw ore is a fines ore fraction which has been separated from a total ground, raw ore containing a coarse ore fraction and a fines ore fraction.

6. A method in accordance with claim 5 wherein the fines ore fraction has been separated from the total ground, raw ore by wet classification.

7. A method in accordance with claim 1 wherein the mineral values include uranium values.

8. A method in accordance with claim 1 wherein the polar solvent is water.

9. A method in accordance with claim 1 wherein the contacting step is carried out by contacting the raw ore countercurrently with at least one of (1) the polar solvent and (2) the nonpolar solvent.

10. A method for upgrading a ground, raw ore containing mineral values and recovering said mineral values from the upgraded ore, comprising:

(a) contacting said raw ore with both a polar solvent and a nonpolar solvent, which solvents are immiscible with one another, to form a mixture of said raw ore, said polar solvent and said nonpolar solvent;

(b) said polar solvent and said nonpolar solvent being present in amounts sufficient to form two, immiscible, separable, liquid phases;

(c) settling the thus formed mixture for a time sufficient to effect separation of two immiscible liquid phases, including; a liquid, polar solvent phase, containing an ore fraction having a lower percentage of said mineral values than said raw ore, and a liquid, nonpolar solvent phase, containing an ore fraction having a higher percentage of said mineral values than said raw ore;

(d) separating said polar solvent phase from said nonpolar solvent phase;

(e) further separating said polar solvent from said ore fraction having a lower percentage of said mineral values;

(f) further separating said nonpolar solvent from said ore fraction having a higher percentage of said mineral values; and (g) recovering said mineral values from one of (1) both said ore fraction having a higher percentage of said mineral values and said ore fraction having a lower percentage of mineral values, and (2) said ore fraction having a higher percentage of mineral values.

11. A method in accordance with claim 10 wherein the raw ore is a total ground, raw ore containing both a coarse ore fraction and a fines ore fraction.

12. A method in accordance with claim 11 which additionally includes separating the coarse ore fraction during one of (1) the contacting step and (2) the separation of the polar solvent phase from the nonpolar solvent phase, and the ore fraction having a lower percentage of mineral values is a first portion of the fines ore fraction and the ore fraction having a higher percentage of mineral values is a second portion of said fines ore fraction.

13. A method in accordance with claim 12 wherein the mineral values are recovered from one of (1) the second portion of the fines ore fraction having a higher percentage of mineral values and the coarse ore fraction, (2) said second portion of the fines ore fraction having a higher percentage of mineral values, said coarse ore fraction and the first portion of the fines ore fraction having a lower percentage of mineral values, (3) said second portion of the fines ore fraction having a higher percentage of mineral values and said first portion of the fines ore fraction having a lower percentage of mineral values and (4) said second portion of the fines ore fraction having a higher percentage of mineral values.

14. A method in accordance with claim 13 wherein the recovery of the mineral values includes recovery of the mineral values from the thus separated coarse ore fraction and said recovery of said mineral values comprises roasting said coarse ore fraction in the presence of an oxidizing gas to produce an ash containing said mineral values and leaching the thus produced ash with one of (1) an acidic leach solution and (2) an alkaline leach solution.

15. A method in accordance with claim 12 wherein the coarse ore fraction is separated during the step of separating the polar solvent phase from the nonpolar solvent phase.

16. A method in accordance with claim 10 wherein the ore is a fines ore fraction which has been separated from a total ground, raw ore containing a coarse ore fraction and a fines ore fraction.

17. A method in accordance with claim 16 wherein the fines ore fraction has been separated from the total ground, raw ore by wet classification.

18. A method in accordance with claim 10 wherein the mineral values are recovered from the ore fraction having a higher percentage of mineral values.

19. A method in accordance with claim 10 wherein the mineral values are recovered by leaching the ore fraction in question with one of (1) an acidic leach solution and (2) an alkaline leach solution.

20. A method in accordance with claim 10 wherein the mineral values include uranium values.

21. A method in accordance with claim 10 wherein the polar solvent is water.

22. A method in accordance with claim 10 wherein the contacting step is carried out by countercurrently contacting the raw ore with at least one of (1) the polar solvent and (2) the nonpolar solvent.

* * * * *